(12) United States Patent
Stephenson et al.

(10) Patent No.: US 6,612,171 B1
(45) Date of Patent: Sep. 2, 2003

(54) GRAVITY MEASURING APPARATUS

(75) Inventors: Kenneth E. Stephenson, Newtown, CT (US); Robert L. Kleinberg, Ridgefield, CT (US); Douglas D. Griffin, Bethel, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 152 days.

(21) Appl. No.: 09/630,251

(22) Filed: Aug. 1, 2000

(30) Foreign Application Priority Data

Aug. 3, 1999 (GB) .............................................. 9918124

(51) Int. Cl.$^7$ ................................................ G01V 7/04
(52) U.S. Cl. .................. 73/382 R; 73/382 G; 73/152.54
(58) Field of Search ........................... 73/382 R, 382 G, 73/152.05, 152.54

(56) References Cited

U.S. PATENT DOCUMENTS

| | | |
|---|---|---|
| 4,255,969 A | 3/1981 | Lautzenhiser |
| 4,457,168 A | 7/1984 | Lautzenhiser et al. |
| 5,204,568 A | 4/1993 | Kleinberg et al. |
| 5,448,912 A | 9/1995 | Black |
| 5,970,787 A | 10/1999 | Wignall |

FOREIGN PATENT DOCUMENTS

| | | |
|---|---|---|
| EP | 0 177 196 A2 | 4/1986 |
| GB | 2 138 141 A | 10/1984 |
| GB | 2 141 244 A | 12/1984 |

OTHER PUBLICATIONS

Torge, W. *Gravimetry* Berlin: Walter de Gruyter 1989, pp. 148–151, 180–181, 224–241, 378–381.
Chapin, D. "Gravity Instruments: Past, Present, Future" The Leading Edge, Jan. 1998, pp. 100–112.
Block, B., et al., "Measurements in the Earth Mode Frequency Range by an Electrostatic Sensing and Feedback Gravimeter" Jounal of Geophysical Research, Sep. 1966, vol 71, pp. 4361–4375.
Moore, R. D., et al "Linearization and Calibration of Electrostatically Fedback Gravity Meters" Journal of Geophysical Research, Feb. 1970, vol 75, pp. 928–932.
Longman, I. M. "Formulas for Computing the Tidal Accelerations Due to the Moon and the Sun" Journal of Geophysical Research, Dec. 1959, vol 64, pp. 2351–2355.
Warburton, R. J., et al "Detailed Gravity–Tide Spectrum Between One and Four Cycles per Day" Geophysical Journal of the Royal Astronomical Society, 1978, vol 52, pp. 117–136.

*Primary Examiner*—John E. Chapman
(74) *Attorney, Agent, or Firm*—William L. Wang; William B. Batzer; John J. Ryberg

(57) ABSTRACT

A gravity measuring apparatus is provided comprising a gravitational force detector including a test mass and which produces measurements related to gravitational force exerted on the test mass, characterized in that the gravitational force detector is adapted for use downhole and includes a compensator to compensate for errors in measurements made whilst downhole. The compensator may comprise a guide rail along which the gravitational force detector is moveable over a calibrated distance. Where the test mass is biased toward an equilibrium position about which measurements are made.

10 Claims, 2 Drawing Sheets

GRAVITY MEASURING APPARATUS

FIELD OF THE INVENTION

This invention relates to gravity measuring apparatus for use in a borehole, and in particular gravity measuring apparatus which is able to compensate for long term drift in measurements made by the apparatus.

BACKGROUND TO THE INVENTION

Gravity measurements within boreholes are used to monitor fluid movements within a reservoir, such as oil displacement by water or liquid displacement by gas. Such fluid movements occur normally in oil and gas reservoirs as fluids are produced from or injected into wells. In many cases, it is desirable to control the movement of fluids within the reservoir by controlling production or injection rates to maximise producible reserves or to minimise production of water. However, to intelligently control the movement of reservoir fluids, it is necessary to measure parameters such as bulk formation density which are sensitive to the movement of these fluids.

However once the gravity measuring apparatus, or gravity meter, is downhole, it is inaccessible unless withdrawn from the borehole. Long term drift occurs in measurements made by gravity meters and whilst drift can be readily compensated for in the case of surface gravity meters, compensation is a particular problem when gravity meters are placed downhole. This is particularly so as to withstand conditions downhole, stability is often sacrificed for apparatus robustness which increases problems with long term drift.

SUMMARY OF THE INVENTION

It is one aim of the present invention to provide gravity measuring apparatus which can compensate for drift in measurements made when downhole, and which is sensitive to the movement of fluids within a reservoir.

In accordance with one aspect of the present invention there is provided a gravity measuring apparatus comprising gravitational force detection means including a test mass and which produces measurements related to gravitational force exerted on the test mass, characterised in that the gravitational force detection means is adapted for use downhole and includes compensation means to compensate for errors in measurements made whilst downhole.

By providing compensation means, measurements relating to the gravitational force can be corrected downhole for offset errors occurring within the apparatus.

By measuring the spatial gradient of gravity, offset errors can be compensated for. Thus preferably the compensation means may enable movement of the gravitational force detection means between at least two spaced apart positions to produce at least two measurements, and the compensation means may offset the two measurements against each other to compensate for errors.

Thus the compensation means may comprise a guide rail along which the gravitational force detection means is moveable over a calibrated distance. This is of particular advantage where the gravity measuring apparatus is removably positioned downhole on a wireline.

Where the test mass is biased by a biasing means, such as a spring, toward an equilibrium position about which measurements are made, compensation may occur by attaching the biasing means to the compensation means, with the compensation means being responsive to and compensating for changes in biasing force associated with the biasing means.

Preferably the test mass is attached to a first lever and is suspended between first electromagnetic field generating elements and the compensation means is attached to the first lever by the biasing means so as to compensate for changes in biasing force.

One form of compensation means may comprise a second lever and second electromagnetic field generating elements, wherein at least part of the second lever is positioned at an equilibrium position between the second electromagnetic field generating elements, and movements about the equilibrium position are used to compensate for changes in biasing force.

The first and second electromagnetic field generating elements desirably communicate with feedback means, with the feedback means altering the electromagnetic field generated by the first and second electromagnetic field generating elements so as to maintain the first and the second levers at their respective equilibrium positions, with signals produced by the second electromagnetic field generating elements being used by the feedback means to compensate for changes in biasing force.

Where the apparatus to be used permanently downhole, preferably the biasing means is made of non-magnetic steel for improved stability.

In accordance with another aspect of the invention, a further gravity measuring apparatus is provided, the apparatus comprising gravitational force detection means including a test mass and which produces measurements related to gravitational force exerted on a test mass, characterised in that the test mass is biased by a biasing means toward an equilibrium position about which measurements are made, and the biasing means is attached to compensation means to compensate for changes in biasing force associated with the biasing means.

The gravity measuring apparatus as aforesaid may be adapted for use permanently downhole, and may be used in a horizontal borehole.

The invention also lies in a method of installing a gravity measuring apparatus within a borehole, comprising the steps of incorporating a gravity measuring apparatus in drill pipe and placing the drill pipe down a borehole to complete a well for fluid production.

The invention will now be described by way of example, with reference to the accompanying drawings in which:

DESCRIPTION

Figure 1:
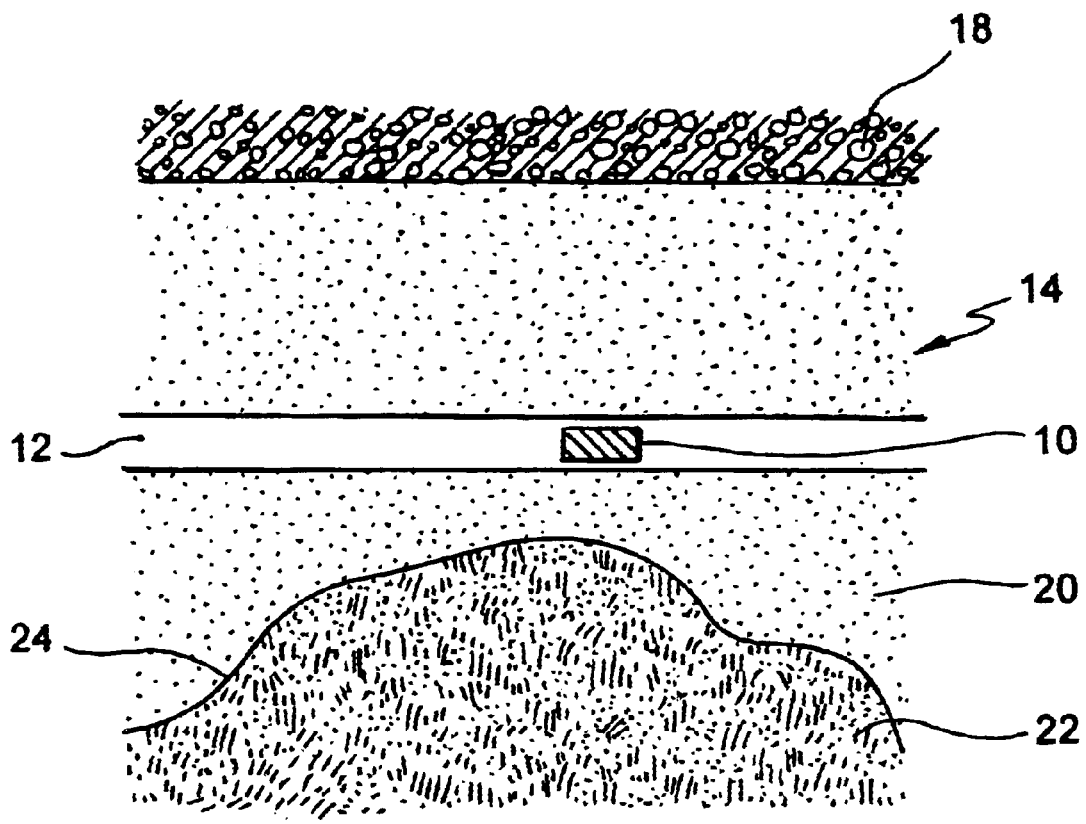
FIG. 1 shows a schematic diagram of a gravity measuring apparatus according to the present invention when in position downhole.

In FIG. 1, a gravity meter 10 in accordance with the present invention is shown within a horizontal borehole 12 in an oil-producing formation 14, although the gravity meter may also be placed in a vertical borehole. A gas zone 18, oil-bearing zone 20 and water-bearing zone 22 occur within the formation 14. The gravity meter 10 detects the position of an oil/water contact line 24 between the oil-bearing zone 20 and the water-bearing zone 22 by monitoring changes in the gravitational force, $$F = \frac{GMm}{r^2}$$

where F is the gravitational force resulting from two masses m and M attracting each other, M is the effective mass of the Earth, m is a test mass within the gravity meter 10, r is the distance between the centres of the two masses and G is the gravitational constant.

The vertical (z) component of gravity g of sensed at a point (x,y,z) is given by $$g(x, y, z) = G \int\int\int dx'dy'dz' \frac{(z'-z)\rho(x', y', z')}{[(x'-x)^2 + (y'-y)^2 + (z'-z)^2]^{3/2}}$$

where $\rho(x',y',z')$ is the density at the source point $(x',y',z')$ inside the formation and G is the universal constant of gravitation, $6.67 \times 10^{-8}$ cm$^3$g$^{-1}$ sec$^{-2}$.

A borehole gravity survey is sensitive to the bulk density $\rho$, which changes when oil or gas are produced. The density depends on the volumes and densities of the solid and fluid components of the reservoir:

$$\rho = (1-\phi)\rho_{ma} + \phi S_w \rho_w + \phi S_o \rho_o + \phi S_g \rho_g$$

where $\phi$ is the formation porosity; $\rho_{ma}$, $\rho_w$, $\rho_o$, and $\rho_g$ are the densities of matrix, water, oil, and gas respectively; and $S_w$, $S_o$, and $S_g$ are water, oil, and gas saturations, respectively. As production continues, saturations and formation density change.

Since density depends on fluid saturations, borehole gravity is able to monitor fluid movements. Because the volume of investigation is very large, gravity measurements are significantly affected by distant large-scale structures and by basin geometry. Thus a borehole survey is preferably made when a well is first drilled. This initial gravity profile is sensitive to both the geological setting and fluid saturations. The differences between the initial and subsequent surveys depend only on fluid saturation changes, assuming there is no subsidence or other structural change. Thus time-lapse gravity measurements can detect gas, oil, or water movement within the formation.

When the oil/water contact line 24 moves upward as the result of removal of oil from the formation 14 or reservoir, the force of gravity on the test mass m within the gravity meter increases. This is because water has a higher density than oil, and as water moves upward within the formation the centre of M moves so that r between the centres of the respective masses is reduced. Similarly, if the gas cap moves downwards, the gas is lower in density than the oil it replaces and again there is a change in the mass distribution of M with the centre of mass M moving so that r is reduced again. Thus the gravitational force on the test mass m increases. By monitoring changes in the gravitational force with time, the movement of fluids within the reservoir 14 can be tracked.

When completion of a well occurs, gravity meters and other sensors within the wellbore are used to measure properties of the oil-bearing formation 14 and borehole fluids. Analysis of these properties allows the manipulation of valves associated with the completed well to control flow rates and pressures so as to optimise recovery from an oil-bearing formation. The sensors, power source, method of telemetry, method of deployment of the sensors and type of completion are all highly interrelated. By use of a gravity meter within the borehole 12, and not external to the borehole casing, a method for monitoring fluid fronts is provided where power, telemetry and deployment is simplified by providing a wireline contained within the completion string itself. Since gravity is a deep reading, any gravity sensor does not have to be in direct contact with the formation and may be installed within the completion string along with flow/temperature/pressure sensors, all connected to the surface via wireline.

Changes in fluid density distribution within the reservoir only produce very small changes in gravitational force, typically of the order of 10 ng, and thus accurate compensation for instrumental error is a necessity to achieve measurements downhole over long periods of time.

Figure 2:
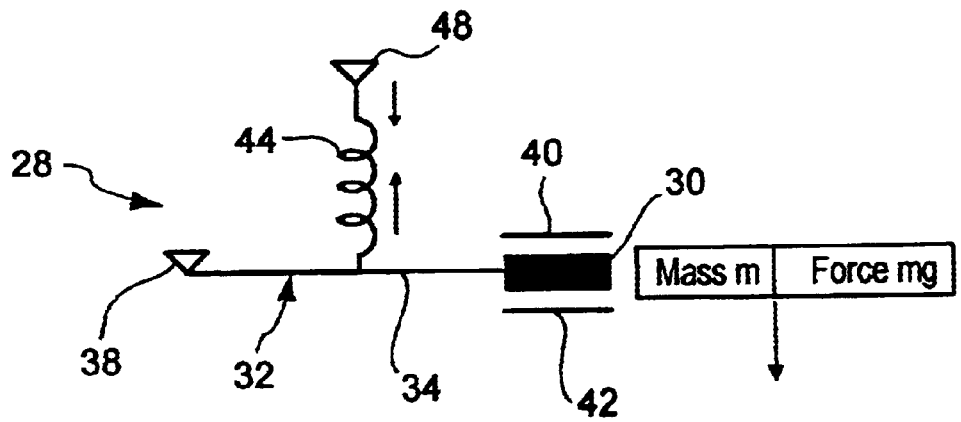
FIG. 2 shows a prior art gravity measuring apparatus.

A prior art gravity meter 28 is shown in FIG. 2. This gravity meter is known as a Lacoste-Romberg meter and relies on a null measurement technique. Other prior art gravity meters are described in W. Torge, "Gravimetry", Berlin: Walter de Gruyter (1989) and D. Chapin, "Gravity Instruments: Past, Present, Future," The Leading Edge, January 1998, pg. 100–112. The gravity meter 28 comprises a test mass 30 attached to one end of a lever 32. The lever 32 comprises a beam 34 and a fulcrum 38, with the fulcrum 38 provided at the end of the beam 34 distal from the test mass 30. The test mass 30 is centred electrostatically between two capacitor plates 40, 42 and is held in this equilibrium central position as a result of an upwards biasing force provided by a spring 44 attached to an upper support 48. The capacitor plates 40, 42 are connected to an electrical supply, such as a battery, via a feedback system and generate an electrostatic field.

When a change in gravitational force occurs due to a change in the mass distribution of M, this change in force will act to move the test mass 30 away from the centred position and so extend the spring 44. However any change in position of the test mass 30 is immediately detected by the feedback system which alters the electrical field applied to the capacitor plates 40, 42 to keep the test mass 30 electrostatically centred between the plates 40, 42 and so prevent movement of the test mass 30 away from the equilibrium position. The amount of change in electrical field required to maintain the test mass 30 in the central equilibrium position provides a measure of the change in gravitational force.

Suitable electrostatic position sensing and force feedback systems for use in such meters are described in B. Block and R. D. Moore, "Measurements in the Earth Mode Frequency Range by Electrostatic Sensing and Feedback Gravimeter", Journal of Geophysical Research 71, 4361–4375 (1966), and R. D. Moore and W. E. Farrell, "Linearization and Calibration of Electrostatically Fedback Gravity Meters," Journal of Geophysical Research 75, 928–932 (1970).

A major cause of instrumental error in such gravity meters is the suspension system and, in particular, the spring 44 which balances the gravitational force on the test mass 30. Slow changes in spring strength are indistinguishable from changes in gravity and produce errors such as scale factor drift and bias drift in the measurements made by the conventional gravity meter.

Scale factor drifts alter the meter's sensitivity to gravity changes. Scale factor drifts are amplification errors and for a permanently emplaced gravity meter can be monitored by comparing the semidiurnal variation of meter output to the tidal variation of gravity, which can be calculated with great precision at any point on earth [I. M. Longman, "Formulas for Computing the Tidal Acceleration Due to the Moon and the Sun", Journal of Geophysical Research 64, 2351–2355 (1959); R. J. Warburton and J. M. Goodkind, "Detailed Gravity-Tide Spectrum Between One and Four Cycles per Day", Geophysical Journal of the Royal Astronomical Society 52, 117–136 (1978)].

However the bias drift is an offset error which is more difficult to monitor, because it mimics the slow variations in gravity associated with reservoir fluid movements.

One way to compensate for bias drift is to measure the spatial gradient of gravity, rather than the absolute value. This is accomplished by using a relative gravity meter held on a wireline within a borehole. The relative gravity meter is similar to the prior art gravity meter relying on a test mass held between centring capacitor plates with the assistance of a biasing means such as a spring. However the relative gravity meter has a rail of calibrated distance on which a test mass moves between two spaced apart positions, or stations. This gravity meter thus measures the difference in gravitational force between the two spaced apart positions along the borehole, the two positions being either vertically or horizontally spaced. As the relative gravity meter needs to be rugged to survive travel downhole on a wireline, a quartz spring is used to support the test mass as quartz springs are more robust, although less stable, than steel springs.

The gradient in gravitational force at spaced apart positions along the borehole 12 will change as the reservoir fluid fronts 24 move and provide information similar to the absolute value of gravity. Drift correction errors will be small if the two consecutive measurements along the rail are made effectively at the same time and applying linear and non-linear drift correction terms to the measurements obtains a differential gravity reading. Thus when the gravity meter 10 is shuttled back and forth between two stations, bias drifts can be measured and removed from the differential measurement.

Figure 3:
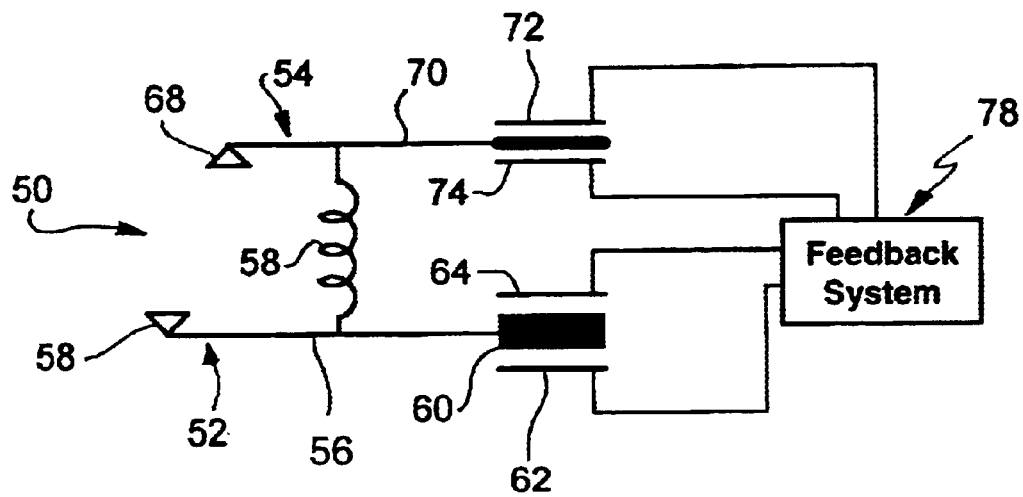
FIG. 3 shows a schematic diagram of the gravity measuring apparatus in accordance with the invention.

Another way to compensate for bias drift, and which permits temporal measurements of gravitational force to be made, is to compensate for changes in spring strength with the gravity meter 50 shown in FIG. 3. The gravity meter 50 comprises two levers 52, 54 interconnected by a non-magnetic steel, or other non-magnetic metal, spring 58. A test mass m 60 is attached to one end of the first lever 52, which comprises a beam 56 and a fulcrum 58, with the fulcrum 58 provided at the end of the beam 56 distal from the test mass 60. The test mass 60 is electrostatically centred between two capacitor plates 62, 64 and is held in this central position as a result of an upwards biasing force provided by the non-magnetic steel spring 58 attached to the second lever 54. The second lever similarly comprises a fulcrum 68 and beam 70, with the spring 58 attached partway along the beam 70 and the end of the beam distal from the fulcrum 68 positioned centrally between another pair of capacitor plates 72, 74. Beam 70 has a relatively small mass m1 compared to lower beam 60 which has a much larger mass $m_2$, i.e. $m_1 \gg m_2$. The spring 58 is held immovable by the second pair of capacitor plates 72, 74 and a feedback system 78. The lever 54 can be made to have very low mass and is assumed to have zero mass. Each pair of capacitor plates 62, 64, 72, 74 is connected to an electrical supply, such as a battery, via one common feedback system 78.

Assuming the spring is prestressed so that it tends to pull the masses $m_1$ and $m_2$ towards each other, the spring being assumed to be massless, the force on the upper beam 70 is given by $$F_U = -F_{SU} - k(z_U - z_L) - m_1 g + E_U$$

where $F_U$ is the upward force on the mass $m_1$, k is the spring constant of the spring 58, $z_U$ is the upward displacement of the upper mass $m_1$ from its null position between position-sensing plates 72 and 74, $z_L$ is the upward displacement of the lower mass from its null position between position-sensing plates 62 and 64, $F_{SU}$ is the force exerted by the spring 58 when the masses are in their null positions, i.e. $z_U = z_L = 0$, g is the local acceleration of gravity, and $E_U$ is the upward force exerted by the electrostatic feedback system to maintain the mass m1 at $z_U = 0$.

The force on the lower beam 56 is given by $$F_L = +F_{SL} - k(z_L - z_U) - m_2 g + E_L$$

where $F_L$ is the upward force on the test mass $m_2$, k is the spring constant of the spring 58, $z_L$ is the upward displacement of the lower mass from its null position between position-sensing plates 62 and 64, $z_U$ is the upward displacement of the upper mass from its null position between position-sensing plates 74 and 72, $F_{SL}$ is the force exerted by the spring when the mass is in its null position, i.e. $z_L = z_U = 0$, g is the local acceleration of gravity, and $E_L$ is the upward force exerted by the electrostatic feedback system to maintain the mass $m_2$ at $z_L = 0$.

When the two beams are at their null positions and stationary, the forces exerted by the spring on the two masses $m_1$ and $m_2$ must be equal in magnitude $$|F_{SL}| = |F_{SU}| = F_S,$$

where $F_s$ is the bias force.

Operation of the meter is now considered for the following three cases:

(1) Where the bias force $F_S$ changes, the electrostatic forces required to maintain the masses at their null positions change by an equal amount, $\Delta E_U = \Delta E_L$.

(2) Where the spring constant k changes, there is no effect, because the masses are maintained at their null positions, $z_U = z_L$.

(3) Where the gravitational acceleration g changes, for $m_2 \gg m_1$, the electrostatic restoring forces required to renull the beams 56, 70 will be much greater for the more massive element than for the less massive element, i.e. $\Delta E_L \gg \Delta E_U$. This is clearly distinguished from cases (1) and (2). Thus the practice of this invention eliminates the possibility that bias and scale factor changes in the spring can mimic changes of the local gravitational acceleration.

Thus when a change in gravitational force occurs, the feedback system 78 detects the effect of this on the test mass 60 and alters the electrical field applied to the capacitor plates 64, 62 to ensure the test mass 60 remains electrostatically centred between the plates and that negligible movement of the test mass occurs. The amount of change in electrical field required to maintain the test mass 60 in the central position of electrostatic equilibrium provides a measure of the change in gravitational force. Any change in elasticity of the spring 58 will be reflected in the feedback signal produced by the second pair of capacitor plates 72, 74, which again will act to ensure negligible movement of the second lever 54. When change in gravitational force on the test mass 60 occurs, the change in force is reflected in the feedback signal supplied to the first pair of centring capacitor plates 62, 64. However, since the test mass does not move (and therefore the spring does not move), there is no effect on the second lever 54 and no feedback signal is generated in the second pair of centring plates 72, 74.

Where a change in the elasticity of the spring 58 occurs, which would produce a bias drift in measurements, the change in spring strength will affect both the test mass 60 and the second lever 54, generating feedback signals from both pairs of capacitor plates. A proportion of the feedback signal from the second pair of centring plates 72, 74 is then used to compensate the test mass feedback signal for drift in spring strength, so providing automatic compensation for bias drift when in situ downhole.

In this way, measurements of gravitational force are possible over time without being affected by bias drift and the permanent installation of a gravity meter in an oil well is enabled. The time lapse monitoring of gravity will provide information about the movement of fluids within the neighbouring reservoir.

What is claimed is:

1. A gravity measuring apparatus comprising:
   a gravitational force detector adapted for use downhole comprising:
      a test mass, the detector being configured to produce measurements related to gravitational force exerted on the test mass;
      a biasing system adapted and arranged to exert a biasing force on the test mass; and
      a compensator adapted to compensate for errors in measurements made whilst downhole, the compensator comprising a compensation lever positioned relative to an electrostatic field generating element, wherein movements of the compensation lever relative to the electrostatic field generating element are used to compensate for changes in the biasing force.

2. A gravity measuring apparatus according to claim 1, wherein the gravitational force detector is moveable between at least two spaced apart positions to produce at least two measurements, and the compensator is adapted to subtract one measurement from the other to yield gradient measurements being compensated for errors.

3. A gravity measuring apparatus according to claim 2, wherein the gravitational force detector is moveable over a calibrated distance.

4. A gravity measuring apparatus according to claim 1, wherein the biasing system biases the test mass toward an equilibrium position about which measurements are made, and the biasing system is attached to the compensator.

5. A gravity measuring apparatus according to claim 4, wherein the test mass is attached to a first lever and is suspended between first electrostatic field generating elements and the compensator is attached to the first lever by the biasing system so as to compensate for changes in biasing force.

6. A gravity measuring apparatus according to claim 5, wherein the compensator comprises a plurality of electrostatic field generating elements, wherein at least part of the compensation lever is positioned at an equilibrium position between the plurality of electrostatic field generating elements, and movements about the equilibrium position are used to compensate for changes in biasing force.

7. A gravity measuring apparatus according to claim 6, wherein the first and the plurality of electrostatic field generating elements communicate with a feedback system, the feedback system altering the electrostatic field generated by the first and the plurality of electrostatic field generating elements so as to maintain the first and the compensation levers at their respective equilibrium positions, with signals produced by the plurality of electrostatic field generating elements being used by the feedback system to compensate for changes in biasing force.

8. A gravity measuring apparatus according to claim 4, wherein the biasing system is made of steel.

9. A gravity measuring apparatus according to claim 8, wherein the biasing system is made of non-magnetic steel.

10. A method of using a gravity measuring apparatus comprising the steps of:
    installing in a borehole a gravity measuring apparatus according to claim 1; and
    using said gravity measuring apparatus in the borehole.

* * * * *